(12) United States Patent
Murata et al.

(10) Patent No.: US 9,243,663 B2
(45) Date of Patent: Jan. 26, 2016

(54) ROLLING BEARING AND POWER TRANSMISSION DEVICE INCLUDING ROLLING BEARING

(71) Applicant: JTEKT CORPORATION, Osaka-shi, Osaka (JP)

(72) Inventors: Junji Murata, Kashiba (JP); Shigeo Kamamoto, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/453,958

(22) Filed: Aug. 7, 2014

(65) Prior Publication Data

US 2015/0063735 A1     Mar. 5, 2015

(30) Foreign Application Priority Data

Aug. 28, 2013  (JP) ................. 2013-176529
Aug. 28, 2013  (JP) ................. 2013-176532

(51) Int. Cl.
| F16C 33/66 | (2006.01) |
|---|---|
| F16C 33/46 | (2006.01) |
| F16C 19/36 | (2006.01) |
| F16C 19/54 | (2006.01) |
| F16C 33/58 | (2006.01) |

(52) U.S. Cl.
CPC ............... *F16C 33/46* (2013.01); *F16C 19/364* (2013.01); *F16C 19/548* (2013.01); *F16C 33/583* (2013.01); *F16C 33/6651* (2013.01); *F16C 33/6681* (2013.01); *F16C 33/4623* (2013.01); *F16C 2210/04* (2013.01); *F16C 2240/44* (2013.01)

(58) Field of Classification Search
CPC ...... F16C 33/36; F16C 33/366; F16C 33/586; F16C 33/6651; F16C 33/6681; F16C 37/007
USPC .................. 384/465, 470, 471, 572
See application file for complete search history.

(56) References Cited

U.S. PATENT DOCUMENTS

2014/0369635 A1* 12/2014 Kamamoto ........... F16C 37/007
                                                           384/467

FOREIGN PATENT DOCUMENTS

| DE | 10 2009 048 952 A1 | 4/2011 |
|---|---|---|
| EP | 0 654 613 A1 | 5/1995 |
| EP | 2 816 247 A1 | 12/2014 |
| JP | H07-259864 A | 10/1995 |
| JP | 2007-032612 A | 2/2007 |
| JP | A-2008-082547 | 4/2008 |

OTHER PUBLICATIONS

Mar. 30, 2015 Extended Search Report issued in European Application No. 14180813.9.

* cited by examiner

*Primary Examiner* — Phillip A Johnson
(74) *Attorney, Agent, or Firm* — Oliff PLC (57) ABSTRACT

A rolling bearing includes an inner ring; an outer ring coaxially disposed around an outer peripheral surface of the inner ring with an annular space between the inner ring and the outer ring; a plurality of rolling elements rollably disposed in the annular space; a cage that retains the rolling elements; and a bubble generating mechanism that generates bubbles in liquid lubricant during bearing rotation, wherein the liquid lubricant flows through the annular space.

12 Claims, 10 Drawing Sheets

ROLLING BEARING AND POWER TRANSMISSION DEVICE INCLUDING ROLLING BEARING

INCORPORATION BY REFERENCE

The disclosure of Japanese Patent Applications No. 2013-176529 and 2013-176532 filed on Aug. 28, 2013 including the specification, drawings and abstract is incorporated herein by reference in its entirety.

BACKGROUND OF THE INVENTION

1. Field of the Invention

The present invention relates to a rolling bearing and a power transmission device including the rolling bearing.

2. Description of Related Art

In order to achieve torque reduction by reducing a viscous resistance of lubricant, there is a conventional rolling bearing as described in Japanese Patent Application Publication No. 2008-82547 (JP 2008-82547 A), for example. In the rolling bearing, a bubble generating device (a microbubble generator) is disposed outside the rolling bearing so that bubbles generated by the bubble generating device are mixed into lubricant, and then supplied to the rolling bearing. Thus, a viscous resistance of the lubricant is reduced.

However, in the rolling bearing described in JP 2008-82547 A, a dedicated bubble generating device for mixing bubbles into the lubricant and supplying them to the rolling bearing should be disposed outside the rolling bearing, which increases cost and also causes necessity to secure a space in which to dispose the bubble generating device.

SUMMARY OF THE INVENTION

The present invention provides a rolling bearing in which bubbles are generated in lubricant to decrease a viscous resistance of the lubricant without the necessity of disposing a dedicated bubble generating device, and a power transmission device including the rolling bearing.

A first aspect of the present invention relates to a rolling bearing including an inner ring; an outer ring coaxially disposed around an outer peripheral surface of the inner ring with an annular space between the inner ring and the outer ring; a plurality of rolling elements rollably disposed in the annular space; a cage that retains the rolling elements; and a bubble generating mechanism that generates bubbles in liquid lubricant during bearing rotation, wherein the liquid lubricant flows through the annular space.

In the above aspect, the bubble generating mechanism may be a bearing-ring bubble generating mechanism provided in a rotation-side bearing ring that rotates during the bearing rotation, the rotation-side bearing ring being either one of the inner ring and the outer ring.

According to the above aspect, the liquid lubricant flows through the annular space between the inner ring and the outer ring during bearing rotation. At this time, the bearing-ring bubble generating mechanism, which is provided in the rotation-side bearing ring that rotates during the bearing rotation and that is either one of the inner ring and the outer ring, generates bubbles in the lubricant, thereby making it possible to reduce a viscous resistance of the lubricant. With such an extremely simple structure in which the bearing-ring bubble generating mechanism is provided in the rotation-side bearing ring, it is possible to reduce the viscous resistance of the lubricant. Accordingly, unlike a conventional technique, it is not necessary to secure a space in which to dispose a dedicated bubble generating device and to provide the special bubble generating device therein.

In the above aspect, the rolling elements may be rollers; and the bearing-ring bubble generating mechanism may be constituted by multiple recessed portions formed on at least one of a peripheral surface of a rib portion of the rotation-side bearing ring and an axial end face of the rotation-side bearing ring, the rib portion facing end faces of the rollers.

According to the above aspect, it is possible to easily provide the bearing-ring bubble generating mechanism by forming the multiple recessed portions on at least one of the peripheral surface of the rib portion facing the end faces of the rollers and the axial end face of the rotation-side bearing ring. In this case, due to rotation of the rotation-side bearing ring, gas such as air taken in the multiple recessed portions of the rotation-side bearing ring are caught in the lubricant, thereby making it possible to generate bubbles in the lubricant. Thus, the viscous resistance of the lubricant is reduced. Further, a surface area of the rotation-side bearing ring is increased by the multiple recessed portions, and thus, a heat dissipation property is increased due to the increase in the surface area.

In the above aspect, the rollers may be tapered rollers; and the rib portion may include at least one of a small rib portion formed in the rotation-side bearing ring so as to face small-diameter end faces of the tapered rollers, and a large rib portion formed in the rotation-side bearing ring so as to face large-diameter end faces of the tapered rollers.

In a case where the rollers are tapered rollers (that is, in a case of a tapered roller bearing), it is assumed that a large amount of the lubricant flows from a small-diameter side to a large-diameter side due to a pumping operation during the bearing rotation, so that a torque due to a stirring resistance of the lubricant is likely to be increased. However, according to the above aspect, bubbles of air or the like taken in the multiple recessed portions formed in at least one of the small rib portion and the large rib portion of the rotation-side bearing ring are caught in the lubricant, thereby making it possible to generate bubbles in the lubricant. This makes it possible to reduce the viscous, resistance of the lubricant and to reduce a torque.

In the above aspect, the multiple recessed portions constituting the bearing-ring bubble generating mechanism may decrease a pressure of the lubricant in the recessed portions so that the pressure of the lubricant in the recessed portions is equal to or lower than a dissolution limit pressure during the bearing rotation.

According to the above aspect, when the pressure of the lubricant in the multiple recessed portions of the rotation-side bearing ring is decreased so as to be equal to or lower than the dissolution limit pressure due to rotation of the rotation-side bearing ring, gas such as air dissolved in the lubricant comes out from the lubricant to generate bubbles. This also makes it possible to reduce the viscous resistance of the lubricant.

In the above aspect, the multiple recessed portions constituting the bearing-ring bubble generating mechanism may decrease a pressure of the lubricant in the recessed portions so that the pressure of the lubricant in the recessed portions is equal to or lower than a saturation vapor pressure at which the lubricant is changed from a liquid phase to a vapor phase during the bearing rotation.

According to the above aspect, when the pressure of the lubricant in the multiple recessed portions of the rotation-side bearing ring becomes equal to or lower than the saturation vapor pressure at which the lubricant is changed from the liquid phase to the vapor phase, part of the lubricant is changed from the liquid phase to the vapor phase, thereby making it possible to generate bubbles in the lubricant. This makes it possible to reduce the viscous resistance of the lubricant. Further, it can be expected that the lubricant is cooled due to evaporation heat of the lubricant that has changed from the liquid phase to the vapor phase.

In the above aspect, the bubble generating mechanism may be a cage bubble generating mechanism provided in the cage.

According to the above aspect, the liquid lubricant flows through the annular space between the inner ring and the outer ring during bearing rotation. At this time, the cage bubble generating mechanism provided in the cage generates bubbles in the lubricant, thereby making it possible to reduce the viscous resistance of the lubricant. With such an extremely simple structure in which the cage bubble generating mechanism is provided in the cage, it is possible to reduce the viscous resistance of the lubricant. Accordingly, unlike a conventional technique, it is not necessary to secure a space in which to dispose a dedicated bubble generating device and to provide the dedicated bubble generating device therein.

In the above aspect, the cage bubble generating mechanism may be constituted by multiple recessed portions formed on an axial end face of the cage.

According to the above aspect, by forming the multiple recessed portions in the cage, it is possible to easily provide the cage bubble generating mechanism. In this case, due to rotation of the cage, bubbles of air or the like taken in the multiple recessed portions of the cage are caught in the lubricant, thereby making it possible to generate bubbles in the lubricant. Thus, the viscous resistance of the lubricant is reduced. Further, a surface area of the cage is increased by the multiple recessed portions, and thus, a heat dissipation property is increased due to the increase in the surface area.

In the above aspect, the rolling elements may be tapered rollers; a flange portion extending inwardly in a radial direction may be formed in a small-diameter annular portion of the cage; and the cage bubble generating mechanism may be constituted by multiple recessed portions formed on an axial end face of the flange portion.

In a case where the rollers are tapered rollers (that is, in a case of a tapered roller bearing), it is assumed that a large amount of the lubricant flows from a small-diameter side to a large-diameter side due to a pumping operation during the bearing rotation, so that a torque due to a stirring resistance of the lubricant is likely to be increased. However, according to the above aspect, bubbles of air or the like taken in the multiple recessed portions formed on the axial end face of the flange portion of the cage are caught in the lubricant, thereby making it possible to generate bubbles in the lubricant. This makes it possible to reduce the viscous resistance of the lubricant and to reduce a torque.

In the above aspect, the multiple recessed portions constituting the cage bubble generating mechanism may decrease a pressure of the lubricant in the recessed portions so that the pressure of the lubricant in the recessed portions is equal to or lower than a dissolution limit pressure during the bearing rotation.

According to the above aspect, when the pressure of the lubricant in the multiple recessed portions of the cage is decreased so as to be equal to or lower than the dissolution limit pressure due to rotation of the cage, gas such as air dissolved in the lubricant comes out from the lubricant to generate bubbles. This also makes it possible to reduce the viscous resistance of the lubricant.

In the above aspect, the multiple recessed portions constituting the cage bubble generating mechanism may decrease a pressure of the lubricant in the recessed portions so that the pressure of the lubricant in the recessed portions is equal to or lower than a saturation vapor pressure at which the lubricant is changed from a liquid phase to a vapor phase during the bearing rotation.

According to the above aspect, when the pressure of the lubricant in the multiple recessed portions of the cage becomes equal to or lower than the saturation vapor pressure at which the lubricant is changed from the liquid phase to the vapor phase, part of the lubricant is changed from the liquid phase to the vapor phase, thereby making it possible to generate bubbles in the lubricant. This makes it possible to reduce the viscous resistance of the lubricant. Further, it can be expected that the lubricant is cooled due to evaporation heat of the lubricant that has changed from the liquid phase to the vapor phase.

A second aspect of the present invention relates to a power transmission device including the rolling bearing according to the first aspect, wherein the rolling bearing is provided inside the power transmission device so as to rotatably support a rotary shaft.

According to the second aspect, the power transmission device includes the rolling bearing according to the first aspect, and therefore, it is possible to reduce the viscous resistance of the lubricant and to reduce a torque.

According to the above aspects, the bubble generating mechanism makes it possible to reduce the viscous resistance of the lubricant and to reduce a torque.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
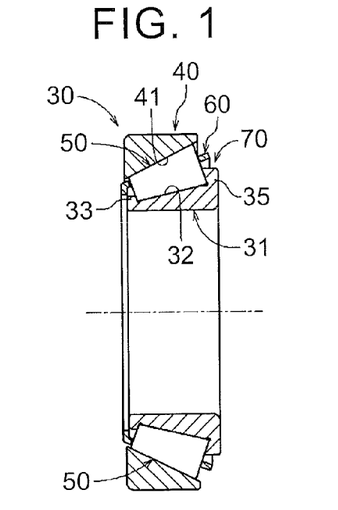
FIG. 1 is an axial sectional view illustrating a rolling bearing according to a first embodiment of the present invention.
Figure 2:
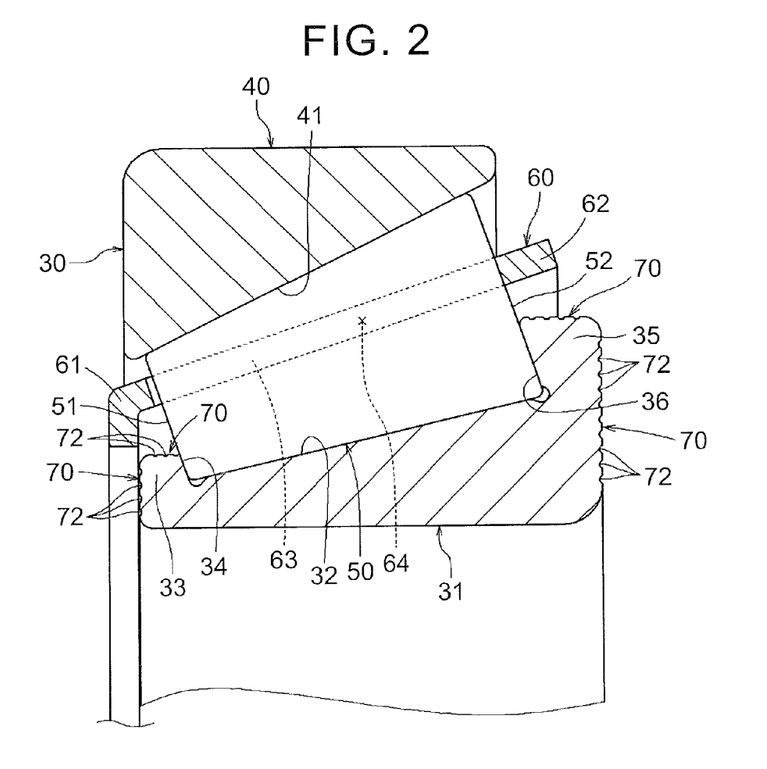
FIG. 2 is an axial sectional view illustrating a relationship between an inner ring, an outer ring, a tapered roller, and a cage in an enlarged manner, according to the first embodiment.
Figure 3:
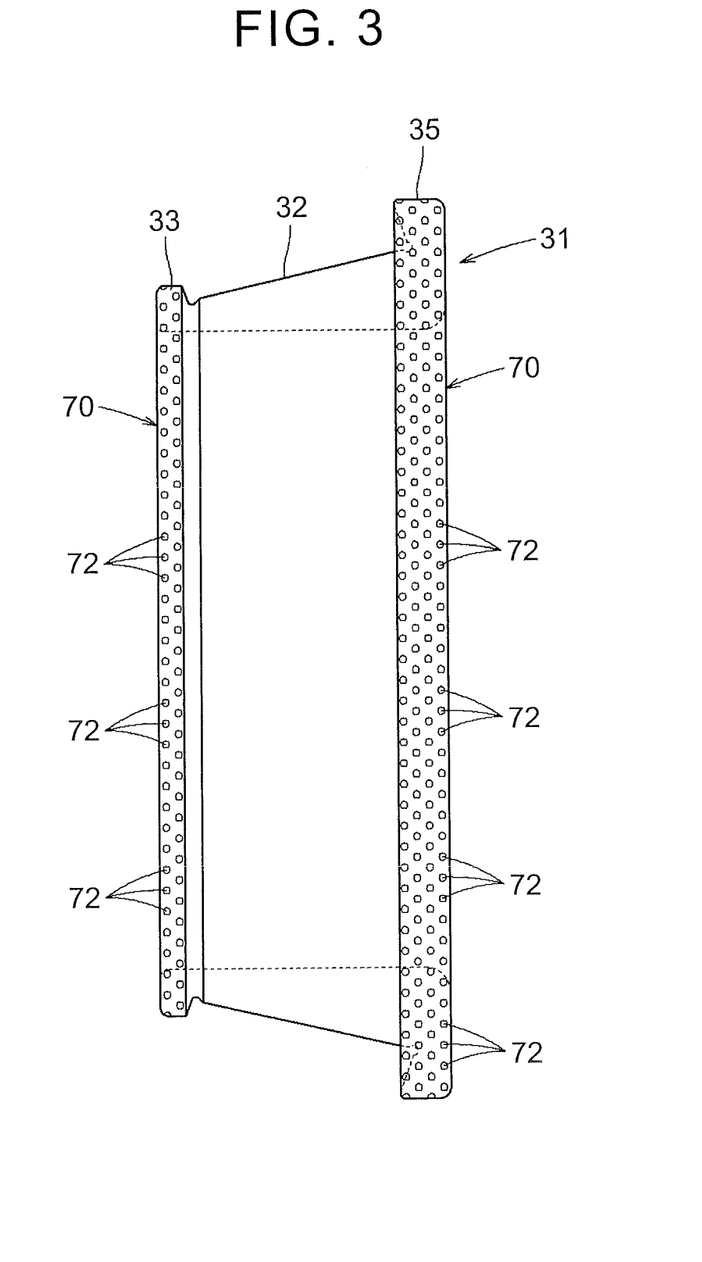
FIG. 3 is a side view illustrating the inner ring as a rotation-side bearing ring in the first embodiment.

A first embodiment of the present invention is described with reference to FIGS. 1 to 3. As illustrated in FIGS. 1, 2, a tapered roller bearing 30 as a rolling bearing includes an inner ring 31, an outer ring 40, a plurality of tapered rollers 50, and a cage 60. The inner ring 31 is formed in a tubular shape so as to have a central hole, and an inner-ring raceway surface 32 having a tapered shaft shape in which a diameter is gradually increased from one end toward the other end is formed on an outer peripheral surface of the inner ring 31. Further, on an outer peripheral surface of one end of the inner ring 31 (a small-diameter side of the inner-ring raceway surface 32), a small rib portion 33 having a guideway 34 that guides small end faces 51 of the tapered rollers 50 is formed, and on an outer peripheral surface of the other end (a large-diameter side of the inner-ring raceway surface 32), a large rib portion 35 having a guideway 36 that guides large end faces 52 of the tapered rollers 50 is formed.

The outer ring 40 is coaxially disposed around the outer peripheral surface of the inner ring 31 with an annular space between the inner ring 31 and the outer ring 40 so as to have a tubular shape, and an outer-ring raceway surface 41 having a tapered hole shape in which a diameter is gradually increased from one end toward the other end is formed on an inner peripheral surface of the outer ring 40. In the annular space between the inner-ring raceway surface 32 of the inner ring 31 and the outer-ring raceway surface 41, the plurality of tapered rollers 50 is rollably disposed in a state where the plurality of tapered rollers 50 is retained by the cage 60.

The cage 60 includes: a small-diameter annular portion 61 and a large-diameter annular portion 62 separated from each other at a predetermined interval in an axial direction; and bar portions 63 connecting the annular portions 61, 62 to each other. Pockets 64 retaining the tapered rollers 50 are formed in parts surrounded by the annular portions 61, 62 and the bar portions 63. The tapered roller bearing 30 is configured such that liquid lubricant flows through the annular space between the inner ring 31 and the outer ring 40.

Figure 4:
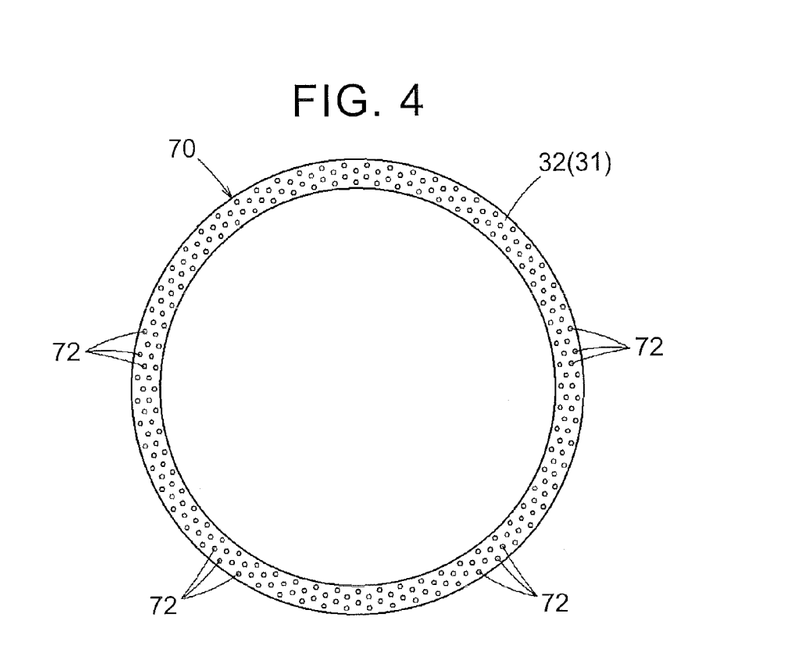
FIG. 4 is an explanatory view illustrating multiple recessed portions constituting a bearing-ring bubble generating mechanism formed in an axial end face of the inner ring, which includes a part of a small rib portion, in the first embodiment.
Figure 5:
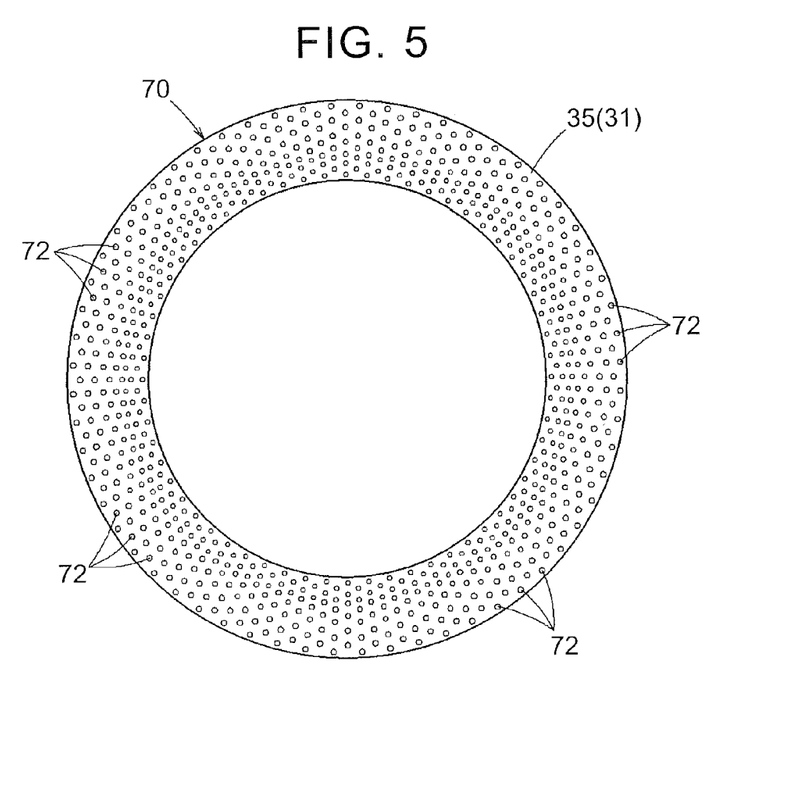
FIG. 5 is an explanatory view illustrating multiple recessed portions constituting the bearing-ring bubble generating mechanism formed in an axial end face of the inner ring, which includes a part of a large rib portion, in the first embodiment.

Out of the bearing rings that are the inner ring 31 and the outer ring 40, a rotation-side bearing ring that rotates during bearing rotation, that is, the inner ring 31 in the first embodiment is provided with a bearing-ring bubble generating mechanism 70 that generates bubbles in the lubricant during bearing rotation. That is, in the first embodiment, the bearing-ring bubble generating mechanism 70 is a bubble generating mechanism that generates bubbles in lubricant during bearing rotation. As illustrated in FIGS. 2, 3, the bearing-ring bubble generating mechanism 70 is constituted by multiple recessed portions 72 formed on an outer peripheral surface of at least one of the small rib portion 33 and the large rib portion 35 of the inner ring 31 as the rotation-side bearing ring. In the first embodiment, as illustrated in FIGS. 3 to 5, the multiple recessed portions 72 are formed on respective outer peripheral surfaces of the small rib portion 33 and the large rib portion 35 of the inner ring 31, and on axial end faces of the inner ring 31, the axial end faces including parts of these rib portions, respectively. Further, the multiple recessed portions 72 are formed by etching machining or shot blast machining. For example, the recessed portion 72 has such a size that a diameter dimension is around 10 μm, and a depth dimension is around 5 μm.

Further, it is desirable that the multiple recessed portions 72 constituting the bearing-ring bubble generating mechanism 70 be set to decrease a pressure of the lubricant in the recessed portions 72 so that the pressure of the lubricant in the recessed portions 72 is equal to or lower than a dissolution limit pressure during bearing rotation. Note that the dissolution limit pressure indicates a pressure at which gas such as air dissolved in the lubricant under a normal pressure cannot maintain its dissolved state in the lubricant due to a pressure of the lubricant, and the gas is changed into bubbles. Further, it is desirable that the multiple recessed portions 72 constituting the bearing-ring bubble generating mechanism 70 be set to decrease the pressure of the lubricant in the recessed portions 72 so that the pressure of the lubricant in the recessed portions 72 is equal to or lower than a saturation vapor pressure at which the lubricant is changed from a liquid phase to a vapor phase, at the time of a bearing rotation.

The tapered roller bearing as the rolling bearing according to the first embodiment is configured as described above. Accordingly, liquid lubricant flows through the annular space between the inner ring 31 and the outer ring 40 during bearing rotation. At this time, the bearing-ring bubble generating mechanism 70 provided in the inner ring 31 as the rotation-side bearing ring generates bubbles in the lubricant, and thus, a viscous resistance of the lubricant is reduced. With such an extremely simple structure in which the bearing-ring bubble generating mechanism 70 is provided in the inner ring 31, it is possible to reduce the viscous resistance of the lubricant. Accordingly, unlike a conventional technique, it is not necessary to secure a space in which to dispose a dedicated bubble generating device and to dispose the dedicated bubble generating device therein.

In the first embodiment, the multiple recessed portions 72 are formed on the respective outer peripheral surfaces of the small rib portion 33 and the large rib portion 35 of the inner ring 31, and on the axial end faces of the inner ring 31, the axial end faces including the parts of the rib portions 33, 35, respectively. Due to rotation of the inner ring 31, bubbles of air or the like taken in the multiple recessed portions 72 formed on the respective outer peripheral surfaces of the small rib portion 33 and the large rib portion 35 and on the axial end faces of the inner ring 31, which respectively include the parts of the rib portions 33, 35, are caught in the lubricant, thereby making it possible to generate bubbles in the lubricant. Thus, the viscous resistance of the lubricant is reduced. Further, due to the multiple recessed portions 72 formed on the respective outer peripheral surfaces of the small rib portion 33 and the large rib portion 35 and on the axial end faces of the inner ring 31, which respectively include the parts of the rib portions 33, 35, a surface area of the inner ring 31 is increased, and thus, a heat dissipation property is increased due to the increase in the surface area.

Figure 6:
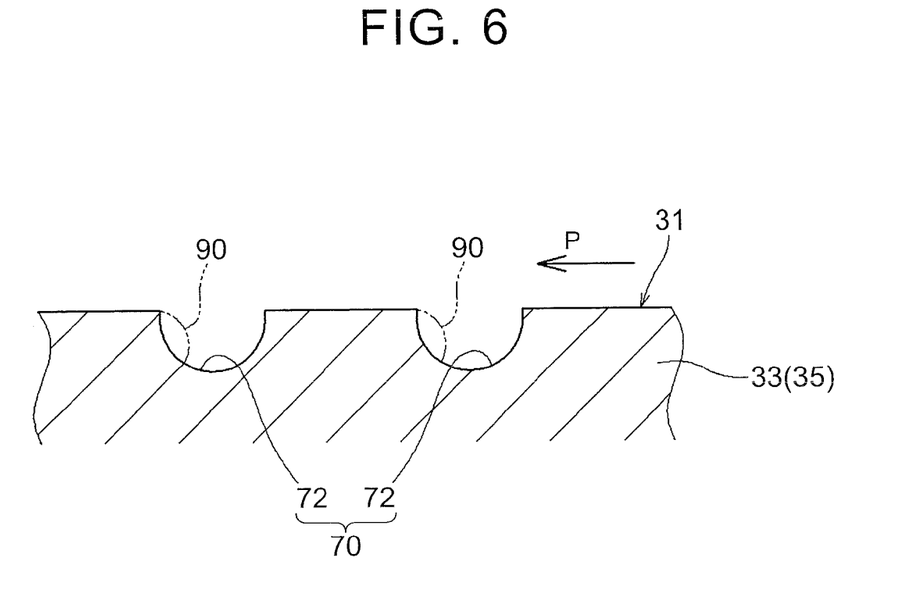
FIG. 6 is an explanatory view illustrating a state where low-pressure parts are caused behind rotation-direction front-side parts of inner wall surfaces of the multiple recessed portions constituting the bearing-ring bubble generating mechanism in the first embodiment.

Further, as illustrated in FIG. 6, during bearing rotation, low-pressure parts 90 are caused behind rotation-direction front-side parts of inner wall surfaces of the multiple recessed portions 72 constituting the bearing-ring bubble generating mechanism 70 (the multiple recessed portions 72 formed on the respective outer peripheral surfaces of the small rib portion 33 and the large rib portion 35 and on the axial end faces of the inner ring 31, which include the parts of the rib portions 33, 35, respectively), the rotation-direction front-side parts being front-side parts of the inner wall surfaces in a rotation-direction (an arrow-P direction in FIG. 6). In the first embodiment, the multiple recessed portions 72 are set so that the pressure of the lubricant in the multiple recessed portions 72 is decreased so as to be equal to or lower than the dissolution limit pressure at the low-pressure parts 90. When the pressure of the lubricant in the multiple recessed portions 72 is decreased so as to be equal to or lower than the dissolution limit pressure due to rotation of the inner ring 31, gas such as air dissolved in the lubricant comes out from the lubricant to generate bubbles. This also makes it possible to reduce the viscous resistance of the lubricant.

Further, in the first embodiment, the multiple recessed portions 72 are set so that the pressure of the lubricant is decreased so as to be equal to or lower than the saturation vapor pressure, at which the lubricant is changed from the liquid phase to the vapor phase, at the low-pressure parts 90 of the multiple recessed portions 72 during bearing rotation. Thus, at the low-pressure parts 90 of the multiple recessed portions 72, the pressure of the lubricant is equal to or lower than the saturation vapor pressure at which the lubricant is changed from the liquid phase to the vapor phase. This changes part of the lubricant from the liquid phase to the vapor phase, thereby making it possible to generate bubbles in the lubricant. This makes it possible to reduce the viscous resistance of the lubricant. Further, it can be expected that the lubricant is cooled due to evaporation heat of the lubricant that has changed from the liquid phase to the vapor phase. As a result, it is possible to provide the tapered roller bearing 30 suitable as a rolling bearing for a high-speed rotation.

Figure 7:
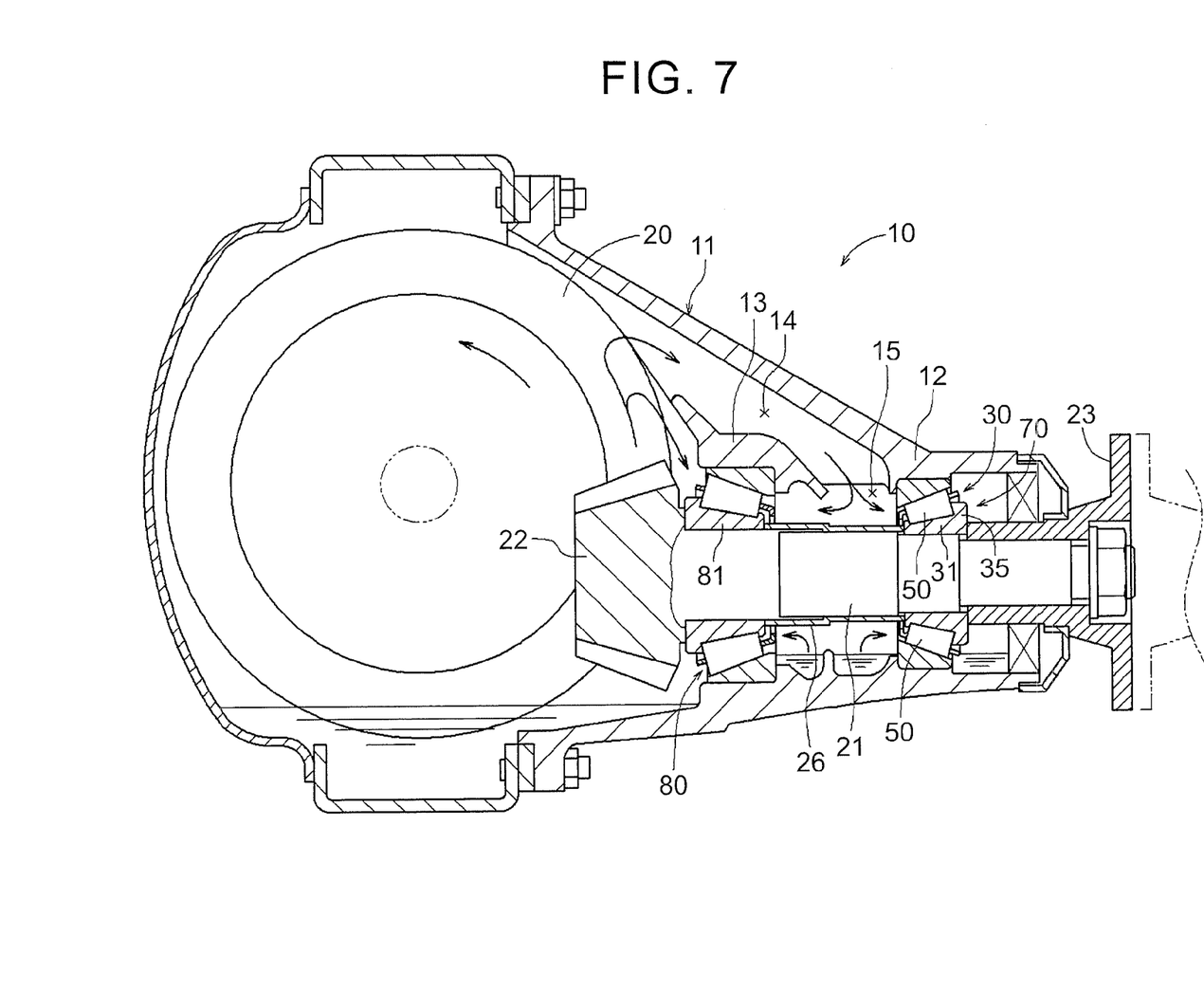
FIG. 7 is an axial sectional view illustrating a differential device as a power transmission device including the rolling bearing according to the first embodiment.

Next will be described a differential device 10 as a power transmission device including the tapered roller bearing 30 as the rolling bearing described in the first embodiment, with reference to FIG. 7. As illustrated in FIG. 7, inside a differential carrier 11 of the differential device 10, bearing housings 12, 13 provided at a predetermined interval in an axial direction are formed. Front and rear tapered roller bearings 30, 80 for rotatably supporting front and rear parts of a pinion shaft 21 (corresponding to a rotary shaft of the present invention) are fitted to the bearing housings 12, 13, respectively. At least the tapered roller bearing 30 out of the tapered roller bearings 30, 80 is the tapered roller bearing as described in the first embodiment.

Further, one end of both ends of the pinion shaft 21 projects from the differential carrier 11, and a companion flange 23 connected to a propeller shaft (not shown) is fitted to the one end. A pinion 22 meshing with a ring gear 20 fitted to a differential case (not shown) in the differential carrier 11 is provided in the other end of the pinion shaft 21 in a torque transmittable manner. A final reduction gear unit is constituted by the ring gear 20 and the pinion 22. Further, a spacer member 26 is provided between the inner rings 31, 81 of the tapered roller bearings 30, 80. Further, lubricant is provided and sealed in a lower part of the differential carrier 11 so that a predetermined oil level is achieved. Note that, as well known, a differential gear mechanism is provided in the differential case (not shown).

As illustrated in FIG. 7, a lubricant passage 14, into which lubricant brought upward by a rotation of the ring gear 20 flows, is formed in an upper part of the bearing housing 12 in the differential carrier 11, and a supply port 15 for supplying, to the tapered roller bearings 30, 80, the lubricant flowing through the lubricant passage 14 is formed in an upper portion of an area between the bearing housings 12, 13.

The differential device 10 including the tapered roller bearing 30 as described in the first embodiment is configured as described above. Accordingly, at the time when the vehicle runs, the lubricant stored in the lower part of the differential carrier 11 is stirred due to rotation of the ring gear 20, and the lubricant partially flows into the lubricant passage 14 and then flows toward the supply port 15. Then, the lubricant is supplied from the supply port 15 to small-diameter sides of respective annular spaces of the front and rear tapered roller bearings 30, 80. The inner rings 31, 81 of the tapered roller bearings 30, 80 rotate integrally with the pinion shaft 21 that rotates upon receipt of a torque transmitted from the ring gear 20. Thus, the tapered rollers 50 roll and the cages 60 rotate. Further, the lubricant supplied to the small-diameter sides of the respective annular spaces of the front and rear tapered roller bearings 30, 80 flows toward large-diameter sides of the annular spaces by a pumping operation based on the rolling of the tapered rollers 50, so that the lubricant is discharged therefrom.

At least the tapered roller bearing 30 out of the front and rear tapered roller bearings 30, 80 is the tapered roller bearing as described in the first embodiment. Accordingly, bubbles taken in the multiple recessed portions 72 formed on the respective outer peripheral surfaces of the small rib portion 33 and the large rib portion 35 of the inner ring 31 of the tapered roller bearing 30 and on the axial end faces of the inner ring 31, which include the parts of the rib portions 33, 35, respectively, are mixed into the lubricant. Thus, the viscous resistance of the lubricant is reduced, thereby making it possible to appropriately reduce a torque.

Note that the present invention is not limited to the first embodiment, and is realized in various embodiments within the scope of the present invention. For example, the first embodiment deals with an example in which the bearing-ring bubble generating mechanism 70 is constituted by the multiple recessed portions 72 formed on the respective outer peripheral surfaces of the small rib portion 33 and the large rib portion 35 of the inner ring 31 as the rotation-side bearing ring and on the axial end faces of the inner ring 31, which include the parts of these rib portions, respectively. However, the present invention is realized even in a case where the bearing-ring bubble generating mechanism 70 is formed at least one surface among the outer peripheral surfaces of the small rib portion 33 and the large rib portion 35 of the inner ring 31, and the axial end faces of the inner ring 31. Further, the outer ring may be the rotation-side bearing ring. Further, the first embodiment deals with an example in which the rolling bearing is the tapered roller bearing 30, but the rolling bearing may be a cylindrical roller bearing or a ball bearing. In a case where the rolling bearing is a ball bearing, multiple recessed portions constituting the bearing-ring bubble generating mechanism are formed on a peripheral surface of a raceway shoulder of a rotation-side bearing ring and/or an axial end face of the rotation-side bearing ring. Further, the power transmission device may be a device other than the differential device, and may be a transaxle device or the like, for example.

Figure 8:
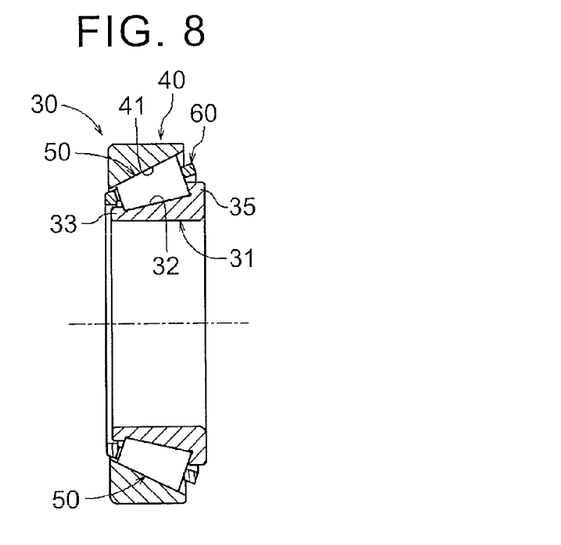
FIG. 8 is an axial sectional view illustrating a rolling bearing according to a second embodiment of the present invention.
Figure 9:
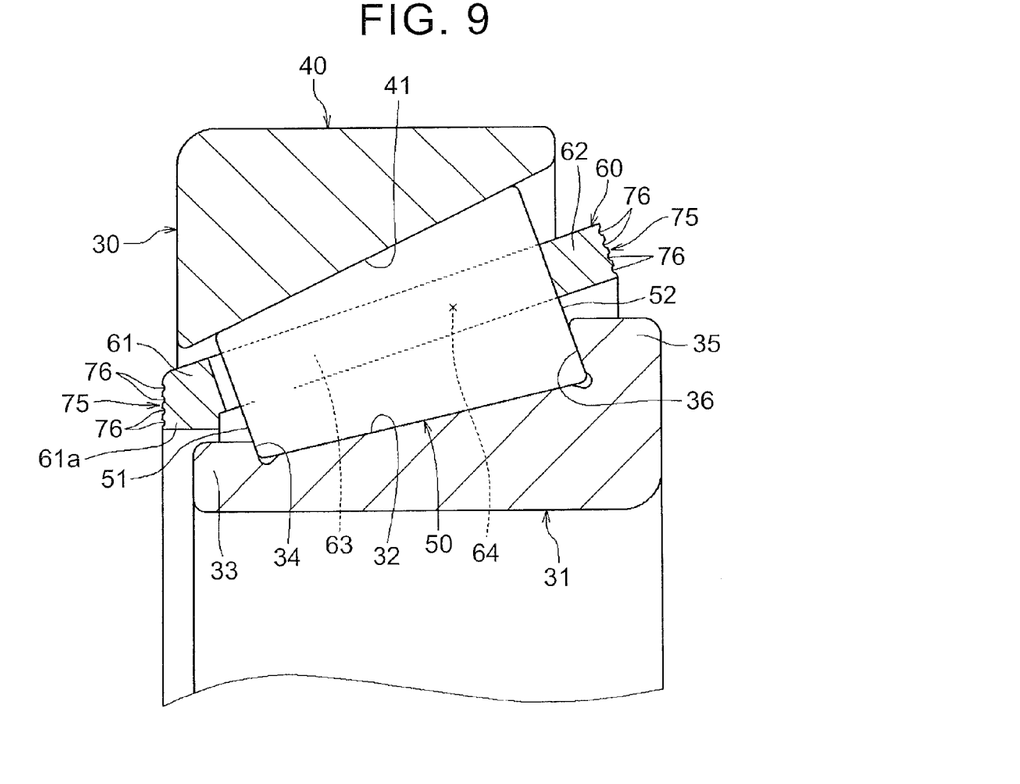
FIG. 9 is an axial sectional view illustrating a relationship between an inner ring, an outer ring, a tapered roller, and a cage in an enlarged manner, according to the second embodiment.

A second embodiment of the present invention is described with reference to FIGS. 8 to 12. As illustrated in FIGS. 8, 9, a tapered roller bearing 30 as a rolling bearing includes an inner ring 31, an outer ring 40, a plurality of tapered rollers 50, and a cage 60. The inner ring 31 is formed in a tubular shape having a central hole, and an inner-ring raceway surface 32 having a tapered shaft shape in which a diameter is gradually increased from one end toward the other end is formed on an outer peripheral surface of the inner ring 31. Further, on an outer peripheral surface of one end of the inner ring 31 (a small-diameter side of the inner-ring raceway surface 32), a small rib portion 33 having a guideway 34 that guides small end faces 51 of the tapered rollers 50 is formed, and on an outer peripheral surface of the other end (a large-diameter side of the inner-ring raceway surface 32), a large rib portion 35 having a guideway 36 that guides large end faces 52 of the tapered rollers 50 is formed.

The outer ring 40 is coaxially disposed around the outer peripheral surface of the inner ring 31 with an annular space between the inner ring 31 and the outer ring 40 so as to have a tubular shape, and an outer-ring raceway surface 41 having a tapered hole shape in which a diameter is gradually increased from one end toward the other end is formed on an inner peripheral surface of the outer ring 40. In the annular space between the inner-ring raceway surface 32 of the inner ring 31 and the outer-ring raceway surface 41, the plurality of tapered rollers 50 is rollably disposed in a state where the plurality of tapered rollers 50 is retained by the cage 60.

Figure 10:
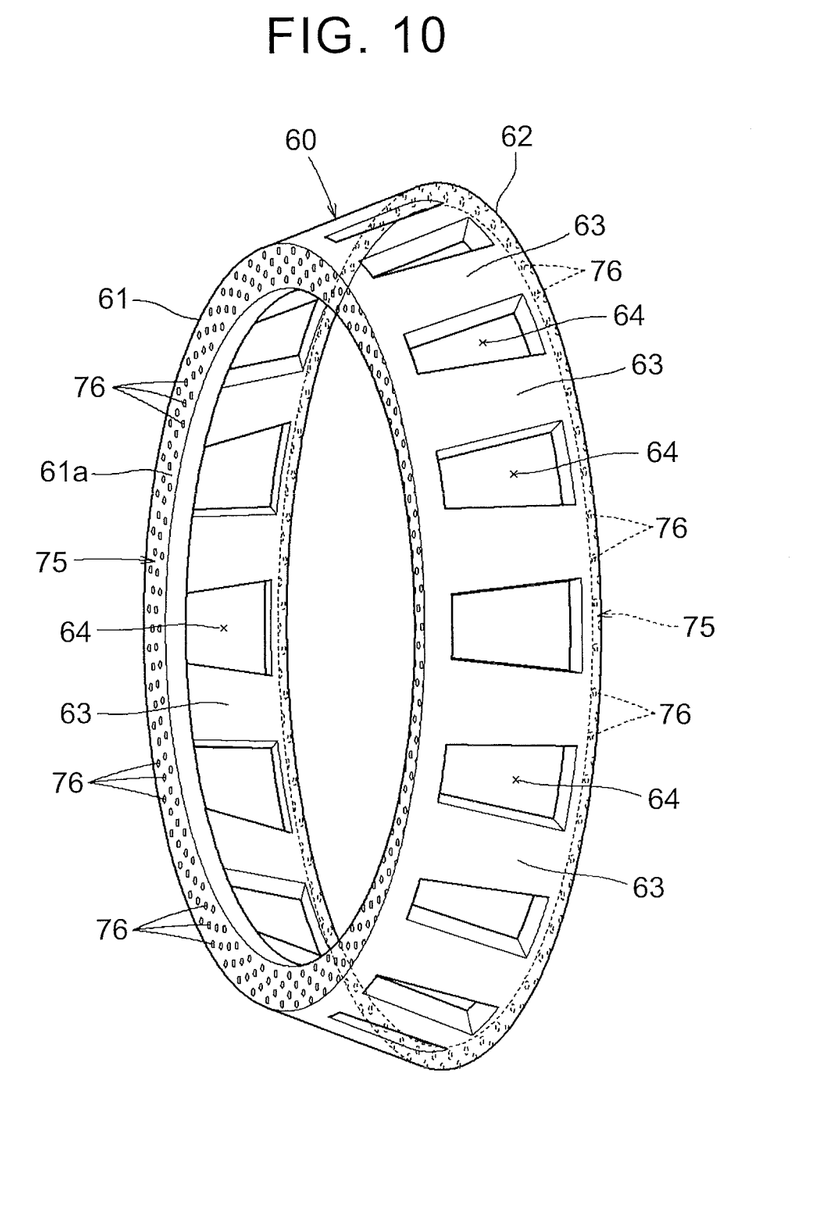
FIG. 10 is a perspective view illustrating the cage in the second embodiment.

The cage 60 is formed of a metal material or a resin material. As illustrated in FIGS. 9, 10, the cage 60 includes: a small-diameter annular portion 61 and a large-diameter annular portion 62 separated from each other at a predetermined interval in an axial direction; and bar portions 63 connecting the annular portions 61, 62 to each other. Pockets 64 retaining the tapered rollers 50 are formed in parts surrounded by the annular portions 61, 62 and the bar portions 63. Further, in the second embodiment, a flange portion 61a is formed in an axial edge of the small-diameter annular portion 61 of the cage 60 so as to extend inwardly in a radial direction up to a position close to an outer peripheral surface of the small rib portion 33 of the inner ring 31. The tapered roller bearing 30 is configured such that liquid lubricant flows through the annular space between the inner ring 31 and the outer ring 40.

Figure 11:
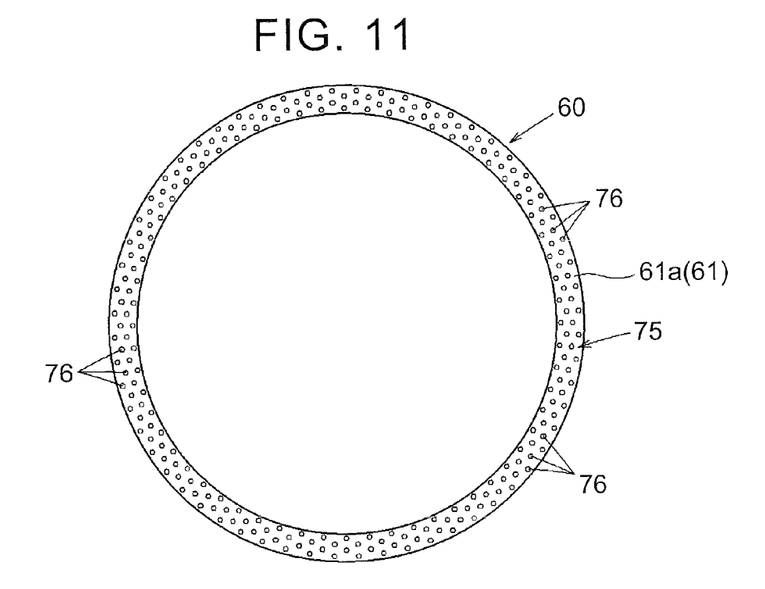
FIG. 11 is an explanatory view illustrating multiple recessed portions constituting a cage bubble generating mechanism formed in an axial small-diameter end face of the cage in the second embodiment.
Figure 12:
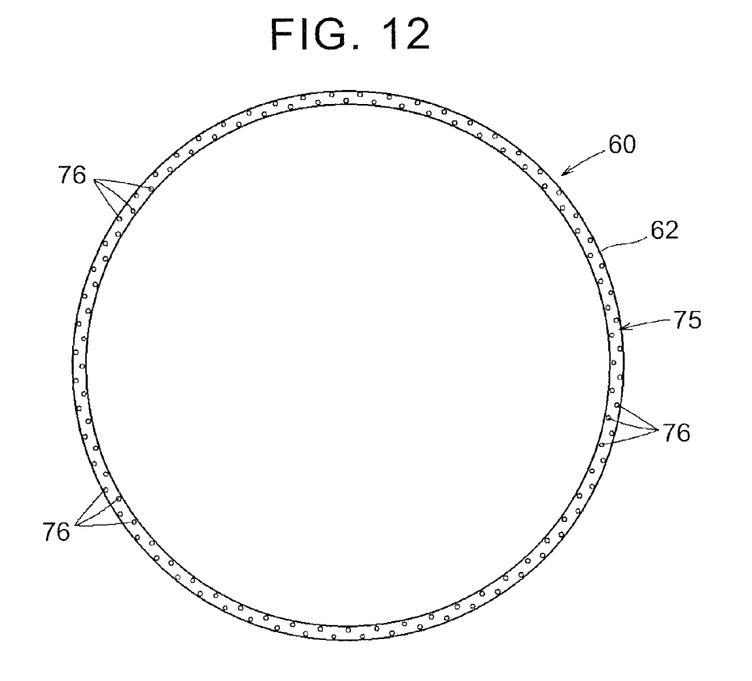
FIG. 12 is an explanatory view illustrating multiple recessed portions constituting the cage bubble generating mechanism formed in an axial large-diameter end face of the cage in the second embodiment.

A cage bubble generating mechanism 75 that generates bubbles in lubricant during bearing rotation is provided in the cage 60. That is, in the second embodiment, the cage bubble generating mechanism 75 is a bubble generating mechanism that generates bubbles in lubricant during bearing rotation. Further, the cage bubble generating mechanism 75 is constituted by multiple recessed portions 76 formed on axial end faces of the cage 60. In the second embodiment, as illustrated in FIGS. 10 to 12, the multiple recessed portions 76 constituting the cage bubble generating mechanism 75 are formed on respective axial end faces of the cage 60, that is, on an axial end face including the flange portion 61a of the small-diameter annular portion 61 of the cage 60 and on an axial end face of the large-diameter annular portion 62 thereof. Further, the recessed portion 76 has such a size that a diameter dimension is around 10 μm, and a depth dimension is around 5 μm, for example.

Further, in a case where the cage 60 is made of metal, the multiple recessed portions 76 are formed by etching machining or shot blast machining. Further, in a case where the cage 60 is made of resin, projection portions for forming the multiple recessed portions 76 are formed on a molding surface of a molding die for forming the cage 60. When a resin material is injected into the molding die, the cage 60 is formed, and at the same time, the multiple recessed portions 76 are formed on the respective axial end faces of the cage 60.

Further, it is desirable that the multiple recessed portions 76 constituting the cage bubble generating mechanism 75 be set to decrease a pressure of the lubricant in the recessed portions 76 so that the pressure of the lubricant in the recessed portions 76 is equal to or lower than a dissolution limit pressure during bearing rotation. Note that the dissolution limit pressure indicates a pressure at which gas such as air dissolved in the lubricant under a normal pressure cannot maintain its dissolved state in the lubricant due to the pressure of the lubricant, and the gas is changed into bubbles. Further, it is desirable that the multiple recessed portions 76 constituting the cage bubble generating mechanism 75 be set to decrease the pressure of the lubricant in the recessed portions 76 so that the pressure of the lubricant in the recessed portions 76 is equal to or lower than a saturation vapor pressure at which the lubricant is change from a liquid phase to a vapor phase, during bearing rotation.

The tapered roller bearing as the rolling bearing according to the second embodiment is configured as described above. Accordingly, liquid lubricant flows through an annular space between the inner ring 31 and the outer ring 40 during bearing rotation. At this time, the cage bubble generating mechanism 75 provided in the cage 60 generates bubbles in the lubricant, and thus, a viscous resistance of the lubricant is reduced. With such an extremely simple structure in which the cage bubble generating mechanism 75 is provided in the cage 60, it is possible to reduce the viscous resistance of the lubricant. Accordingly, unlike a conventional technique, it is not necessary to secure a space in which to dispose a dedicated bubble generating device and to provide the dedicated bubble generating device therein.

In the second embodiment, the multiple recessed portions 76 are formed on the respective axial end faces of the cage 60. Further, bubbles of air or the like taken in the multiple recessed portions 76 formed on the respective axial end faces of the cage 60 are caught in the lubricant due to rotation of the cage 60, thereby making it possible to generate bubbles in the lubricant. Thus, the viscous resistance of the lubricant is reduced. Further, due to the multiple recessed portions 76 formed on the respective axial end faces of the cage 60, a surface area of the cage 60 is increased, and thus, a heat dissipation property is increased due to the increase in the surface area.

Figure 13:
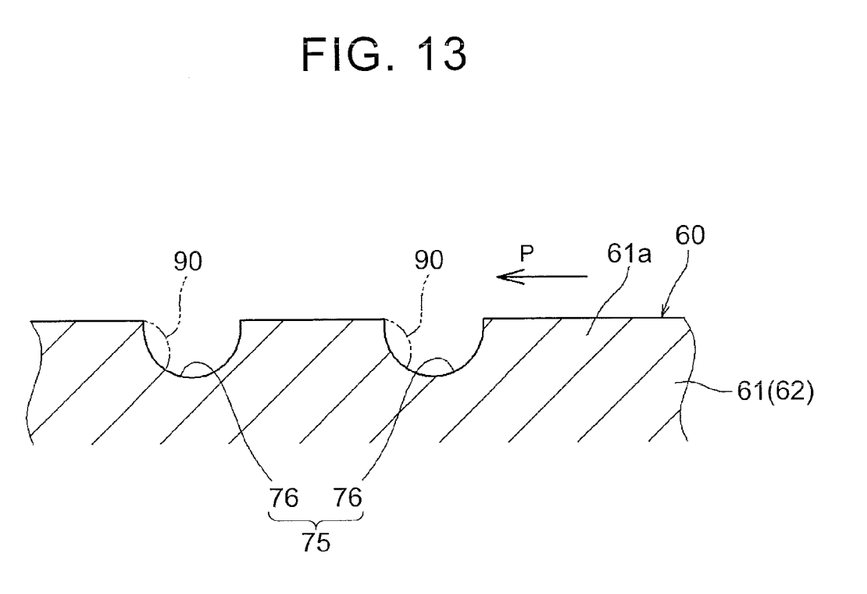
FIG. 13 is an explanatory view illustrating a state where low-pressure parts are caused behind rotation-direction front-side parts of inner wall surfaces of the multiple recessed portions constituting the cage bubble generating mechanism in the second embodiment.

Further, as illustrated in FIG. 13, during bearing rotation, low-pressure parts 90 are caused behind rotation-direction front-side parts of inner wall surfaces of the multiple recessed portions 76 constituting the cage bubble generating mechanism 75, the rotation-direction front-side parts being front-side parts of the inner wall surfaces in a rotation direction (an arrow-P direction in FIG. 13). In the second embodiment, the multiple recessed portions 76 are set so that the pressure of the lubricant in the multiple recessed portions 76 is decreased so as to be equal to or lower than a dissolution limit pressure at the low-pressure parts 90. When the pressure of the lubricant in the multiple recessed portions 76 is decreased so as to be equal to or lower than the dissolution limit pressure due to rotation of the inner ring 31, gas such as air dissolved in the lubricant comes out from the lubricant to generate bubbles. This also makes it possible to reduce the viscous resistance of the lubricant.

Further, in the second embodiment, the multiple recessed portions 76 are set so that the pressure of the lubricant is decreased so as to be equal to or lower than the saturation vapor pressure, at which the lubricant is changed from the liquid phase to the vapor phase, at the low-pressure parts 90 of the multiple recessed portions 76 during bearing rotation. Thus, at the low-pressure parts 90 of the multiple recessed portions 76, the pressure of the lubricant is equal to or lower than the saturation vapor pressure at which the lubricant is changed from the liquid phase to the vapor phase. This changes part of the lubricant from the liquid phase to the vapor phase, thereby making it possible to generate bubbles in the lubricant. This makes it possible to reduce the viscous resistance of the lubricant. Further, it can be expected that the lubricant is cooled due to evaporation heat of the lubricant that has changed from the liquid phase to the vapor phase. As a result, it is possible to provide the tapered roller bearing 30 suitable as a rolling bearing for a high-speed rotation.

Figure 14:
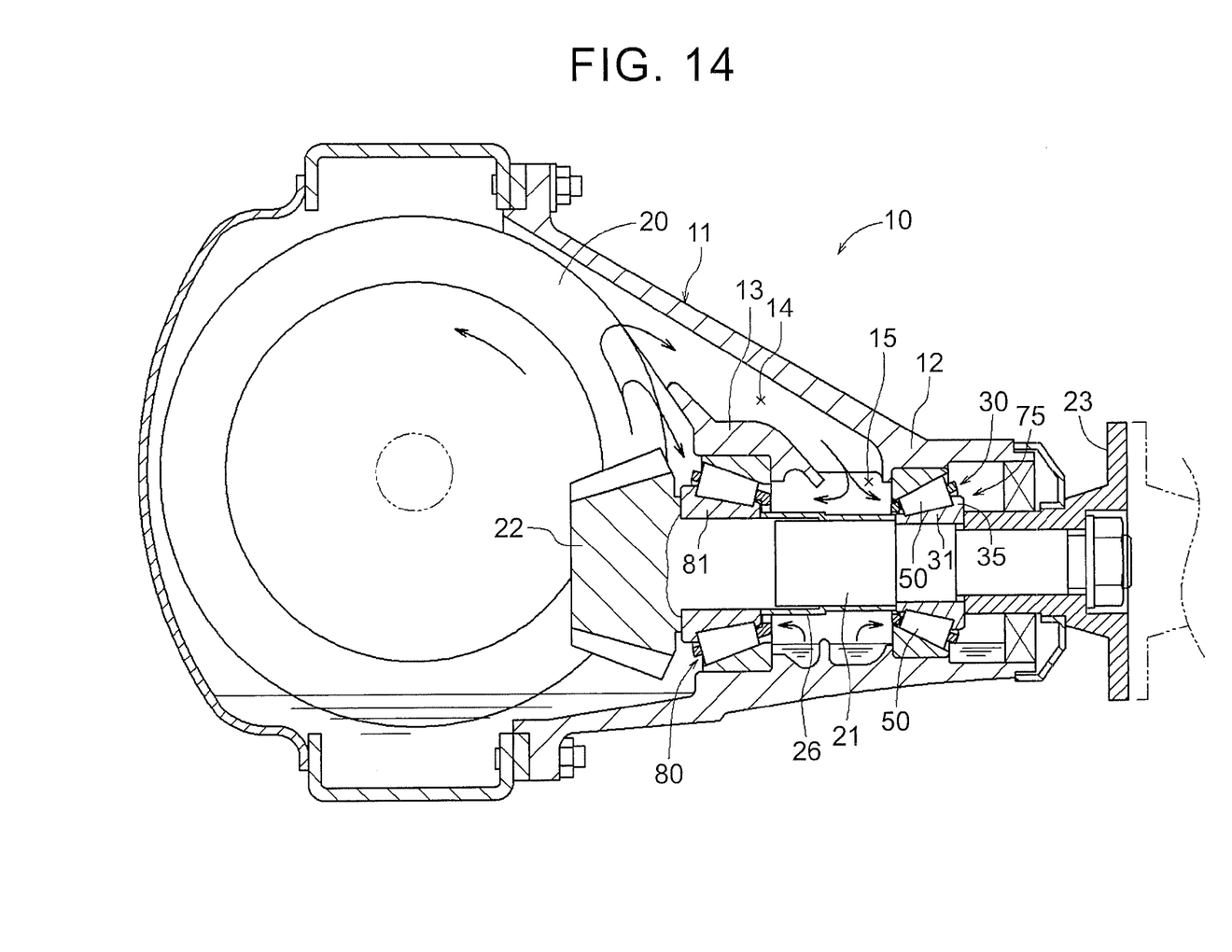
FIG. 14 is an axial sectional view illustrating a differential device as a power transmission device including the rolling bearing according to the second embodiment of the present invention.

Next will be described a differential device 10 as a power transmission device including the tapered roller bearing 30 as the rolling bearing described in the second embodiment, with reference to FIG. 14. As illustrated in FIG. 14, inside a differential carrier 11 of the differential device 10, bearing housings 12, 13 provided at a predetermined interval in an axial direction are formed. Front and rear tapered roller bearings 30, 80 for rotatably supporting front and rear parts of a pinion shaft 21 (corresponding to a rotary shaft of the present invention) are fitted to the bearing housings 12, 13, respectively. At least the tapered roller bearing 30 out of the tapered roller bearings 30, 80 is the tapered roller bearing as described in the second embodiment.

Further, one end of both ends of the pinion shaft 21 projects from the differential carrier 11, and a companion flange 23 connected to a propeller shaft (not shown) is fitted to the one end. A pinion 22 meshing with a ring gear 20 fitted to a differential case (not shown) in the differential carrier 11 is provided in the other end of the pinion shaft 21 in a torque transmittable manner. A final reduction gear unit is constituted by the ring gear 20 and the pinion 22. Further, a spacer member 26 is provided between the inner rings 31, 81 of the tapered roller bearings 30, 80. Further, lubricant is provided and sealed in a lower part of the differential carrier 11 so that a predetermined oil level is achieved. Note that, as well known, a differential gear mechanism is provided in the differential case (not shown).

As illustrated in FIG. 14, a lubricant passage 14, into which lubricant brought upward by a rotation of the ring gear 20 flows, is formed in an upper part of the bearing housing 12 in the differential carrier 11, and a supply port 15 for supplying, to the tapered roller bearings 30, 80, the lubricant flowing through the lubricant passage 14 is formed in an upper portion of an area between the bearing housings 12, 13.

The differential device 10 including the tapered roller bearing 30 as described in the second embodiment is configured as described above. Accordingly, at the time of running or the like of a vehicle, the lubricant stored in the lower part of the differential carrier 11 is stirred due to rotation of the ring gear 20, and the lubricant partially flows into the lubricant passage 14 and flows toward the supply port 15. Then, the lubricant is supplied from the supply port 15 to small-diameter sides of respective annular spaces of the front and rear tapered roller bearings 30, 80. The inner rings 31, 81 of the tapered roller bearings 30, 80 rotate integrally with the pinion shaft 21 that rotates upon receipt of a torque transmitted from the ring gear 20. Thus, the tapered rollers 50 roll and the cages 60 rotate. Further, the lubricant supplied to the small-diameter sides of the respective annular spaces of the front and rear tapered roller bearings 30, 80 flows toward large-diameter sides of the annular spaces by a pumping operation based on the rolling of the tapered rollers 50, so that the lubricant is discharged therefrom.

At least the tapered roller bearing 30 out of the front and rear tapered roller bearings 30, 80 is the tapered roller bearing as described in the second embodiment. Accordingly, bubbles taken in the multiple recessed portions 76 formed on the respective axial end faces of the cage 60 of the tapered roller bearing 30 are mixed into the lubricant. Thus, the viscous resistance of the lubricant is reduced, thereby making it possible to appropriately reduce a torque.

Note that the present invention is not limited to the second embodiment, and is realized in various embodiments within the scope of the present invention. For example, the second embodiment deals with an example in which the multiple recessed portions 76 constituting the cage bubble generating mechanism 75 are formed on the axial end face including the flange portion 61a of the small-diameter annular portion 61 of the cage 60 and the axial end face of the large-diameter annular portion 62 thereof. However, the present invention is also realized even in a case where the multiple recessed portions 76 constituting the cage bubble generating mechanism 75 are formed on at least one of the axial end face including the flange portion 61a of the small-diameter annular portion 61 of the cage 60 and the axial end face of the large-diameter annular portion 62 thereof. Further, the present invention is realized even in a case where multiple recessed portions constituting the cage bubble generating mechanism are formed on a part or parts other than the axial end faces of the cage 60, for example, on an outside-diameter side surface and/or an inside-diameter side surface of at least one of cage components including the small-diameter annular portion 61, the large-diameter annular portion 62, and the bar portions 63. Further, the second embodiment deals with an example in which the rolling bearing is the tapered roller bearing 30, but the rolling bearing may be a cylindrical roller bearing or a ball bearing. Further, the power transmission device may be a device other than the differential device, and may be a transaxle device or the like, for example.

What is claimed is:

1. A rolling bearing comprising:
   an inner ring;
   an outer ring coaxially disposed around an outer peripheral surface of the inner ring with an annular space between the inner ring and the outer ring;
   a plurality of rolling elements rollably disposed in the annular space;
   a cage that retains the rolling elements; and
   a bubble generating mechanism that generates bubbles in liquid lubricant during bearing rotation, wherein the liquid lubricant flows through the annular space.

2. The rolling bearing according to claim 1, wherein the bubble generating mechanism is a bearing-ring bubble generating mechanism provided in a rotation-side bearing ring that rotates during the bearing rotation, the rotation-side bearing ring being either one of the inner ring and the outer ring.

3. The rolling bearing according to claim 2, wherein:
   the rolling elements are rollers; and
   the bearing-ring bubble generating mechanism is constituted by multiple recessed portions formed on at least one of a peripheral surface of a rib portion of the rotation-side bearing ring and an axial end face of the rotation-side bearing ring, the rib portion facing end faces of the rollers.

4. The rolling bearing according to claim 3, wherein:
   the rollers are tapered rollers; and
   the rib portion includes at least one of a small rib portion formed in the rotation-side bearing ring so as to face small-diameter end faces of the tapered rollers, and a large rib portion formed in the rotation-side bearing ring so as to face large-diameter end faces of the tapered rollers.

5. The rolling bearing according to claim 3, wherein:
the multiple recessed portions constituting the bearing-ring bubble generating mechanism decrease a pressure of the lubricant in the recessed portions so that the pressure of the lubricant in the recessed portions is equal to or lower than a dissolution limit pressure during the bearing rotation.

6. The rolling bearing according to claim 3, wherein:
the multiple recessed portions constituting the bearing-ring bubble generating mechanism decrease a pressure of the lubricant in the recessed portions so that the pressure of the lubricant in the recessed portions is equal to or lower than a saturation vapor pressure at which the lubricant is changed from a liquid phase to a vapor phase during the bearing rotation.

7. The rolling bearing according to claim 1, wherein:
the bubble generating mechanism is a cage bubble generating mechanism provided in the cage.

8. The rolling bearing according to claim 7, wherein:
the cage bubble generating mechanism is constituted by multiple recessed portions formed on an axial end face of the cage.

9. The rolling bearing according to claim 8, wherein:
the multiple recessed portions constituting the cage bubble generating mechanism decrease a pressure of the lubricant in the recessed portions so that the pressure of the lubricant in the recessed portions is equal to or lower than a dissolution limit pressure during the bearing rotation.

10. The rolling bearing according to claim 8, wherein:
the multiple recessed portions constituting the cage bubble generating mechanism decrease a pressure of the lubricant in the recessed portions so that the pressure of the lubricant in the recessed portions is equal to or lower than a saturation vapor pressure at which the lubricant is changed from a liquid phase to a vapor phase during the bearing rotation.

11. The rolling bearing according to claim 7, wherein:
the rolling elements are tapered rollers;
a flange portion extending inwardly in a radial direction is formed in a small-diameter annular portion of the cage; and
the cage bubble generating mechanism is constituted by multiple recessed portions formed on an axial end face of the flange portion.

12. A power transmission device comprising:
the rolling bearing according to claim 1, wherein
the rolling bearing is provided inside the power transmission device so as to rotatably support a rotary shaft.

* * * * *